Oct. 11, 1932.  B. J. HASKINS  1,882,581
BATTERY TESTER
Filed May 23, 1929
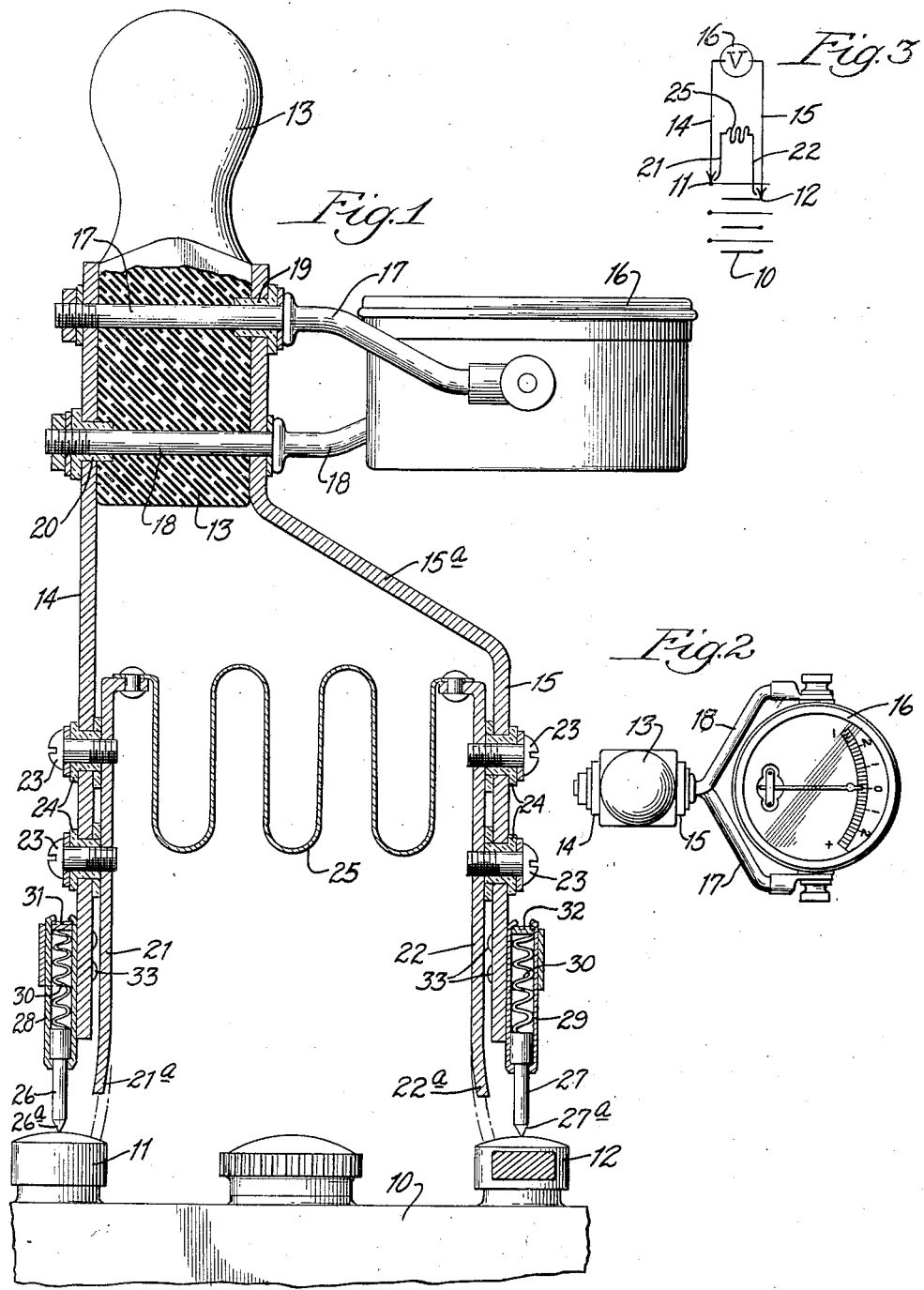
Inventor:
Butler J. Haskins, Patented Oct. 11, 1932

1,882,581

UNITED STATES PATENT OFFICE

BUTLER J. HASKINS, OF CHICAGO, ILLINOIS, ASSIGNOR TO JOSEPH WEIDENHOFF, INC., OF CHICAGO, ILLINOIS, A CORPORATION OF ILLINOIS

BATTERY TESTER

Application filed May 23, 1929. Serial No. 365,471.

This invention relates to improvements in battery testers and, more especially, to such a device particularly adapted for testing the cells of storage batteries. The device may be used, for example, for testing the cells of ignition, lighting and starting storage batteries, as commonly used on motor vehicles.

One of the features of my invention is the provision of such a tester adapted to test a cell either with or without load, the two tests being permitted in rapid sequence with but very slight readjustment of the apparatus.

In my improved device, I provide a separate pair of contacts for the load and a separate pair of contacts for the meter. When the load is on, the reading is taken directly from the cell through individual and separate meter contacts. No contact is ever used to carry both the meter current and the load current. This is a great improvement over devices as heretofore made. Where one terminal is used for both the load and the meter current, there may be some corrosion causing a poor contact and this will materially affect the reading of the meter. In the present invention, when the load is on, the meter terminals are separated from the load terminals and connected directly to the cell. Since only a small amount of current is needed for the meter, any poor contact of one of the meter terminals causes but a small error in the meter reading. Where one terminal is used commonly for both the meter and load, the current passing through such terminal is relatively large (owing to the load demand) and, consequently, any poor contact will cause a relatively great error in the meter reading.

Another advantage in using a device as shown here, with a separate pair of contacts for the load and a separate pair for the meter, is that such device permits the use of a two-post meter instead of a three-post meter. In the older form of devices where one or both terminals are used to carry the meter and load currents and where the load current is shunted across the meter terminals, a three-post meter must be used.

Other features and advantages of my invention will appear more fully as I proceed with my specification.

In that form of device embodying the features of my invention shown in the accompanying drawing—

Figure 1 is a vertical sectional view; Fig. 2 is a top plan view; and Fig. 3 is a wiring diagram.

As shown in the drawing, 10 may indicate a cell being tested, and 11 and 12, the terminal posts thereof.

My device includes a handle 13 made of nonconducting material carrying two meter terminals 14 and 15 which may be metal bars. The former of these is here shown as straight and the other provided with an offset portion 15$^a$ to give a spread between the lower ends thereof substantially equal to the distance between the posts 11 and 12 of a cell.

Numeral 16 indicates a suitable meter, for example, a volt meter, connected across the upper ends of the meter terminals 14 and 15. I have here shown this meter as mounted on the handle 13 by the two bolts 17 and 18 extending through the handle and also through the upper ends of the terminals 14 and 15 and serving to support the same on the handle 13. The bolt 17 is insulated from the terminal 15 by means of an insulating bushing 19 and makes electrical contact with the terminal 14. The bolt 18 is insulated from the terminal 14 by the insulating bushing 20 and makes electrical contact with the terminal 15 where it passes through the same. It is to be understood that the bolts 17 and 18 are connected to the terminals of the meter 16.

Numerals 21 and 22 indicate a pair of load terminals supported by the meter terminals 14 and 15, respectively. As here shown, these load terminals are carried by the meter terminals by means of bolts 23, but each load terminal is insulated from the meter terminal by an insulating bushing 24 surrounding the bolt.

Numeral 25 indicates a suitable resistance element or load element joining the upper ends of the load terminals 21 and 22. The lower ends of the load terminals 21 and 22 are preferably pointed, as indicated by 21$^a$ and 22$^a$, and said ends terminate short of the ends of the retractable extensions on the meter terminals to be hereinafter described.

The lower end of each meter terminal 14 and 15 carries a spring-pressed retractable extension, said extensions being indicated by 26 and 27. The lower ends of these extensions are preferably pointed, as indicated by 26ª and 27ª. Said extensions are mounted in tubes 28 and 29 carried by the lower ends of the terminals 14 and 15 and above each extension in the tube is a suitable spiral spring, as indicated by 30. The spring 30 urges the extension 26 or 27 downwardly.

In the use of the device, when the same is placed with only the extensions 26 and 27 in contact with the cell posts, as shown by the solid lines in Fig. 1, there is obtained a reading on the meter 16 from the cell without load. It will be seen that the current flowing through the terminals 26 and 27 will be of a small amount, the ordinary meter 16 requiring only a small flow of current. By pressing the tester downwardly, the extensions 26 and 27 remain in contact with the cell posts but are retracted or pushed back in the sleeves 28 and 29 against the pressure of the springs 30. The tester may be so pressed downwardly until the ends 21ª and 22ª of the load terminals also engage the cell posts. There will then be a flow of current through the resistance element 25 which is the equivalent of the cell under load. The terminals 26 and 27 still being in contact, the meter 16 will give the reading of the cell under load. It is to be particularly noted, however, that when so under load, the flow of current through the terminals 26 and 27 will not be any greater, but will be only the small amount required for the meter. Consequently, any error in the meter reading due to a possible poor contact by either of the terminals 26 or 27 will be exceedingly slight.

The upper ends of the tubes 28 and 29 are preferably crimped in tightly around closure disks 31 and 32. In order to insure a good connection between the extensions 26 or 27 and the terminals 14 or 15, the ends of the springs 30 are preferably soldered to such extensions at their lower ends; and their upper ends are preferably soldered to the closure members 31 and 32 or to the wall of the tube 28 or 29. The tubes 28 and 29 are here shown as supported on the terminals 14 and 15 by the rivets 33.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible, in view of the prior art.

What I regard as new, and desire to secure by Letters Patent, is:

1. A battery tester of the character described including; a pair of meter terminals a meter connected across said meter terminals; a pair of load terminals; a resistance element connected across said load terminals; and means permitting the terminal posts of a cell to be engaged first by the meter terminals alone and then by the meter terminals with the load terminals, said means including retractable extensions on the meter terminals adapted to be forced back to permit the load terminals to make contact with the posts.

2. A device as claimed in claim 1, in which the load terminals are parallel to and supported by the meter terminals.

3. A device as claimed in claim 1, in which the retractable extensions are mounted in tubes carried at the ends of the meter terminals, said tubes containing springs urging said extensions outwardly.

4. A battery tester of the character described including; a pair of meter terminals; a meter connected across said meter terminals; a pair of spring pressed retractable extensions on the ends of said terminals adapted to be placed in contact with the terminal posts of a cell and retracted by pressure thereon; a pair of load terminals, the ends of said load terminals terminating short of the ends of the extensions on the meter terminals and adapted to be moved into contact with the terminal posts of a cell by downward pressure of the tester to retract said extensions against the spring pressure thereon; and a resistance element connected across the load terminals.

5. A battery tester of the character described including; a handle; a pair of meter terminals carried by said handle; a meter connected across said meter terminals; a pair of spring pressed retractable extensions on the ends of said terminals adapted to be placed in contact with the terminal posts of a cell and retracted by pressure thereon; a pair of load terminals, the ends of said load terminals terminating short of the ends of the extensions on the meter terminals and adapted to be moved into contact with the terminal posts of a cell by downward pressure of the tester to retract said extensions against the spring pressure thereon; and a resistance element connected across the load terminals.

6. A battery tester of the character described including; a pair of meter terminals; a meter connected across said meter terminals; a pair of spring pressed retractable extensions on the ends of said terminals adapted to be placed in contact with the terminal posts of a cell and retracted by pressure thereon; a pair of load terminals supported by the meter terminals, the ends of said load terminals terminating short of the ends of the extensions on the meter terminals and adapted to be moved into contact with the terminal posts of a cell by downward pressure of the tester to retract said extensions against the spring pressure thereon; and a resistance element connected across the load terminals.

7. A battery tester of the character described including; a handle; a pair of meter terminals carried by said handle; a meter connected across said meter terminals; a pair of spring pressed retractable extensions on the ends of said terminals adapted to be placed in contact with the terminal posts of a cell and retracted by pressure thereon; a pair of load terminals supported by the meter terminals, the ends of said load terminals terminating short of the ends of the extensions on the meter terminals and adapted to be moved into contact with the terminal posts of a cell by downward pressure of the tester to retract said extensions against the spring pressure thereon; and a resistance element connected across the load terminals.

8. In an electrical testing device, a connector comprising a terminal engageable with a battery terminal, or the equivalent, and a second terminal carried by and insulated from the first-mentioned terminal and simultaneously engageable with said battery terminal, or its equivalent.

9. In an electrical testing service a connector comprising a terminal engageable with a battery terminal, or the equivalent, and a second terminal carried by and insulated from the first-mentioned terminal and simultaneously engageable with said battery terminal, or its equivalent, said second terminal being movable with respect to the first-mentioned terminal.

10. In a battery tester of the character described, a connector comprising a terminal adapted to be placed in contact with a terminal post of a cell, a second terminal carried by and insulated from the first-mentioned terminal and adapted to contact, simultaneously therewith, said terminal post, said first-mentioned and second terminals being movable relative to each other.

11. A battery tester of the character described, including; a pair of meter terminals; a meter connected across said meter terminals; a pair of load terminals; a resistance element connected across said load terminals; at least one of the meter terminals being adjacent one of the load terminals and insulated therefrom; and means permitting the terminal posts of a cell, or the like, to be engaged, first, by the meter terminals alone, and then by the meter terminals with the load terminals, said means including a retractable extension on one of the meter terminals lying adjacent to, and insulated from, a load terminal, said extension adapted to be forced back to permit the adjacent load terminal to make contact with the post simultaneously with said extension.

12. A battery tester of the character described, including; a meter; a resistance; means for connecting one side of the meter and one side of the resistance to one terminal post of a cell, or the like; and means for first connecting the other side of the meter to the other post of a cell, or the like, and then connecting the other side of the resistance with said other post, said means including a meter terminal and a resistance terminal lying adjacent each other and insulated one from the other, and a retractable extension on said meter terminal, said extension adapted to be brought into engagement with said other posts, and then forced back to permit the adjacent resistance terminal to make contact with said post simultaneously with said extension.

13. A compound terminal for establishing electrical contact with a terminal post of a battery, or the equivalent, said compound terminal comprising a terminal member engageable with said post, or the equivalent, a second terminal member carried by and insulated from the first mentioned terminal member and adapted to be held in simultaneous engagement with said post, or the equivalent, and a resilient member between the first mentioned terminal member and said second terminal member to permit movement therebetween.

14. In electrical testing apparatus, a compound connector for electrically connecting testing elements to the terminal posts of a battery, or the equivalent, said compound connector comprising a terminal member engageable with one terminal post of a battery, or the equivalent, a second terminal member secured to the first terminal member and insulated therefrom, said second terminal member being engageable with a second terminal post of said battery, or the equivalent, and a third terminal member being adapted to be held in engagement with said second terminal post, or the equivalent, at the same time said second terminal member is in engagement therewith.

15. A battery discharge device having a contact member adapted to engage a battery terminal, an electrical connection thereto for connection to a discharge unit for a discharge test, a second contact member engaging said terminal, a third contact member engaging an adjacent terminal, and electrical connections to said second and third contact members for connecting the same to a volt meter for indicating the voltage between said battery terminals.

In witness whereof, I have hereunto set my hand this 15th day of May, 1929.

BUTLER J. HASKINS.